United States Patent
Dec et al.

(10) Patent No.: US 11,898,636 B2
(45) Date of Patent: Feb. 13, 2024

(54) FIXED BELT TENSIONER

(71) Applicant: GATES CORPORATION, Denver, CO (US)

(72) Inventors: Andrzej Dec, Rochester Hills, MI (US); Min Chun Hao, Rochester Hills, MI (US); David P. Rieland, Troy, MI (US)

(73) Assignee: Gates Corporation, Denver, CO (US)

( * ) Notice: Subject to any disclaimer, the term of this patent is extended or adjusted under 35 U.S.C. 154(b) by 43 days.

(21) Appl. No.: 17/846,662

(22) Filed: Jun. 22, 2022

(65) Prior Publication Data
US 2022/0412439 A1    Dec. 29, 2022

Related U.S. Application Data

(60) Provisional application No. 63/214,574, filed on Jun. 24, 2021.

(51) Int. Cl.
*F16H 7/20*    (2006.01)

(52) U.S. Cl.
CPC ..................... *F16H 7/20* (2013.01)

(58) Field of Classification Search
CPC ............. F16H 7/20; F16H 57/021; F16H 7/10
USPC .......................................................... 474/135
See application file for complete search history.

(56) References Cited

U.S. PATENT DOCUMENTS

| | | | |
|---|---|---|---|
| 4,033,196 A * | 7/1977 | Maeda ................. | F16H 7/1281 474/135 |
| 6,689,002 B1 | 2/2004 | Hascoat | |
| 2002/0037783 A1* | 3/2002 | Chambers ............ | F16H 7/1281 474/135 |

FOREIGN PATENT DOCUMENTS

| | | | | |
|---|---|---|---|---|
| CN | 202082353 U | * | 12/2011 | |
| CN | 202833894 U | * | 3/2013 | |
| CN | 104235294 A | * | 12/2014 | ........... F16H 7/0829 |
| CN | 108412989 A | * | 8/2018 | ............... F16H 7/10 |
| DE | 2102921 A1 | | 8/1972 | |
| DE | 4223325 C1 | | 10/1993 | |
| DE | 19634344 A1 | * | 2/1998 | ........... F16H 7/1281 |

OTHER PUBLICATIONS

Mail Stop PCT, ATTN: ISA/US, Commisioner for Patents; Notification of Transmittal of the International Search Report and the Written Opinion of the International Searching Authority; International Patent application No. PCT/US2022/034505; dated Nov. 16, 2022.

* cited by examiner

*Primary Examiner* — Gene O Crawford
*Assistant Examiner* — Emily R Kincaid
(74) *Attorney, Agent, or Firm* — Kevin J. Aiken, Esq.

(57) ABSTRACT

Fixed belt tensioners for a belt system, such as for an exercise bicycle or other belted exercise equipment. The tensioners have the pulley-bearing assembly fixedly attached to the tensioning arm, which is attached to the equipment frame or to a bracket via the same aperture that forms the axis by which the pulley-bearing assembly is attached to the tensioning arm. The arm includes a protrusion or other feature that provides a pivot point for use during the belt installation process. The tensioning arm also incorporates a tensioning adjustment, such as a hex or square hole or protrusion for engagement with a torque wrench or a simple wrench.

20 Claims, 11 Drawing Sheets

FIXED BELT TENSIONER

BACKGROUND

Belt tensioners are generally well-known devices that are used in many belt-drive systems. Tensioners generally apply a constant belt-tensioning force, which compensates for increases in belt length due to wear, belt expansion (e.g., due to increased temperature) and other factors. Fixed belt tensioners have a set force, typically fixed at the initial set-up, compared to automatic tensioners, which have a tensioning feature such as a spring that continuously adjusts the tension force.

Many tensioners and idlers used in fitness bicycles utilize jack screws for belt installation and belt tension adjustment. These constructions make belt installation and belt tension adjustment a lengthy process which frequently requires several attempts to adjust the belt tension to achieve the specified installation tension. Many of these tensioners require the belt to be installed while the tensioning arm is fixed to a predetermined position, which does not always achieve the desired belt tension for use, e.g., because belt length varies. For many tensioners, there is no gauge or measurement to indicate to the installer the applied tension during the installation; it is only after the tensioner is set that the tension can be measured, and adjusted if needed. Additionally, the tensioner and bicycle components are built with ranges of tolerances. When a fixed tensioning arm is combined with the tolerance variations, there is a large belt tension variation from one assembly to another. This also increases assembly cost as once fixed tensioners are mounted, they cannot be adjusted further without disassembling, altering the tension, and remounting. Thus, there is a need for a fixed tensioners improves the accuracy of the belt installation tension, thereby reducing the installation time.

Further, the tensioner assemblies are often fastened to a bicycle bracket via fastener holes in the tensioning arm that is offset from the pulley center. These types of arrangements have a number of disadvantages including decreased rigidity in the connection between the tensioner and bracket, which can lead to non-stable or inaccurate belt tracking, increased size of the tensioner arm, added manufacturing costs, as well as requiring higher installation torque when tensioning the belts.

Thus, there is a need for a fixed belt tensioner that simplifies installation, reduces manufacturing cost and installation torque, and improves belt tracking and retention.

SUMMARY

The present disclosure provides fixed tensioners for a belt system, such as for an exercise bicycle or other belted exercise equipment. The tensioners of this disclosure have the pulley-bearing assembly fixedly attached to the tensioning arm, which is attached to the bicycle frame or a bracket via the same aperture that forms the axis by which the pulley-bearing assembly is attached to the tensioning arm. Together, the tensioner and the bracket form a tensioner assembly. The arm includes a protrusion or other feature that provides a pivot point for use during the belt installation process. The tensioning arm also incorporates a tensioning adjustment, such as a hex or square hole or protrusion for engagement with a hex or square driver tip of a torque wrench or of a simple wrench.

In one particular implementation, this disclosure provides a fixed belt tensioner having a tensioning arm defining an axis, the tensioning arm having a distal end and a proximal end along the axis, a pulley-bearing assembly mounted to the tensioning arm centered on the axis proximate the distal end, a tensioning mechanism on the tensioning arm configured to apply torque to the tensioner, and a passage into the tensioning arm aligned with the axis proximate the proximal end, the passage for receiving a fastener to attach the tensioner to a bracket.

In another particular implementation, this disclosure provides a belt tensioner assembly that includes a tensioner, a mounting bracket, and a fastener. The tensioner has a tensioning arm defining an axis and having a first end and a second end along the axis, a pulley-bearing assembly mounted to the tensioning arm centered on the axis proximate the first end, a tensioning mechanism on the tensioning arm configured to apply torque to the tensioner, and a passage into the tensioning arm aligned with the axis proximate the second end. The bracket has an aperture. The fastener extends through the aperture in the bracket into the passage in the tensioning arm.

In yet another particular implementation, this disclosure provides a method of installing a belt tensioner. The method includes installing a belt on a pulley of the tensioner, then with the belt on the pulley, adjusting the position of the pulley in relation to a bracket by pivoting the tensioner in relation to the bracket, and then tightening (e.g., finger tightening) a fastener retaining the tensioner to the bracket. After tightening the fastener, the method includes applying torque to the tensioner with a tensioning mechanism using a torquing tool, and after applying torque to the tensioner using a torquing tool, further tightening the fastener retaining the tensioner to the bracket.

These and other aspects of the tensioner described herein will be apparent after consideration of the Detailed Description and Figures herein. It is to be understood, however, that the scope of the claimed subject matter shall be determined by the claims as issued and not by whether given subject matter addresses any or all issues noted in the Background or includes any features or aspects recited in the Summary.

DETAILED DESCRIPTION

Figure 1:
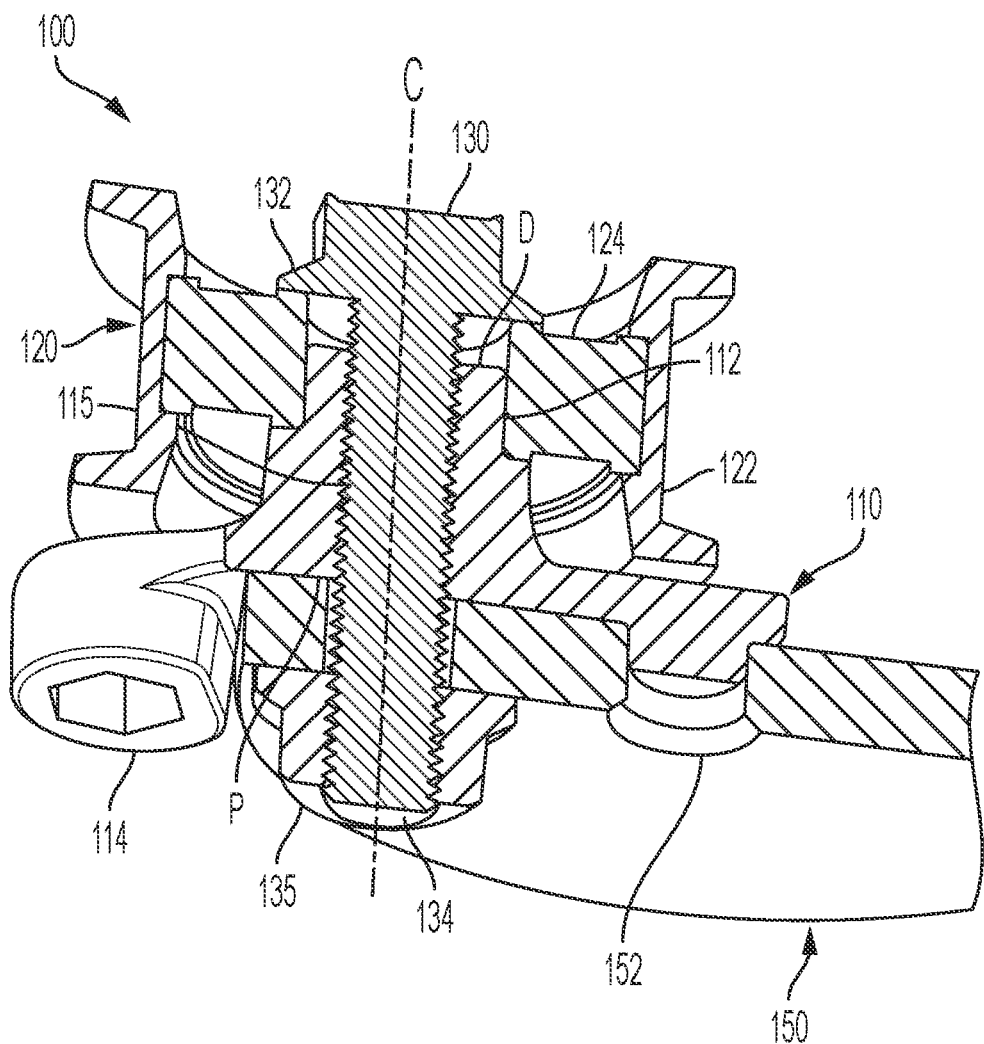
FIG. 1 is a cross-sectional, perspective view of a first example of a tensioner assembly, being a tensioner with a mounting bracket.

As indicated above, the present disclosure is directed to belt tensioners for exercise or fitness equipment, such as an exercise bicycle, stationary bike, and the like with belt drive systems that utilize fixed tensioners.

As described above, many tensioners require the belt to be installed while the tensioning arm is fixed to a predetermined position, which position does not always achieve the desired belt tension for use, e.g., because belt length varies within accepted belt manufacturing tolerances. Also, the tensioner and bicycle components are built with ranges of tolerances. When a fixed tensioning arm is combined with the tolerance variations, there is a large belt tension variation from one assembly to another. The tensioners of this disclosure, however, have a tension value that that is adjusted and fixed while the belt is installed on the pulley, thus avoiding different tension values due to tolerance variations.

Also, some tensioners include a hole (e.g., a threaded hole) in the tensioning arm offset from the pulley center to fix the tensioner to the bicycle frame; this adds an additional hole, or possible weak point, to the tensioning arm, typically requires larger installation torque during tensioning of the belt, and also makes the tensioner more costly. The tensioners of this disclosure, however, utilize the same aperture for fixing the pulley bearing to the tensioning arm and for fixing the tensioning arm to the bicycle frame (or to a bracket connected to the bicycle frame).

The tensioners of this disclosure have the pulley-bearing assembly fixedly attached to the tensioning arm, which is attached to the bicycle frame or a bracket via the same aperture that forms the axis by which the pulley-bearing assembly is attached to the tensioning arm. The arm includes a protrusion or other feature that provides a pivot point for use during the belt installation process. The tensioning arm also incorporates a tensioning adjustment, such as a hex or square hole or protrusion for engagement with a hex or square driver tip of a torque wrench or of a simple wrench. Additionally, the same hole or aperture in the tensioning arm is used for fixing the pulley-bearing assembly to the arm and for fixing the tensioner to the bicycle frame or the bracket. Together, the tensioner and the bracket form a tensioner assembly.

In some designs, the pulley is integrated with the bearing. The pulley can include flanges on either side to help with belt tracking and to inhibit the belt from running into covers or other equipment in case of severe misalignment between the belt drive components.

Overall, the tensioners of this disclosure have a smaller form factor and weight, and are more rigid, than previous designs. They allow for an improved and easier belt installation process, e.g., reduced installation torque. For example, the tensioners facilitate setting of belt tension during installation without need for specialty tools, which shortens belt installation time, and have a more accurate belt installation tension. The tensioners have an improved belt tracking and belt retention than other tensioners.

Additionally, the reduced number of parts (compared to many previous tensioners) reduces the price of the tensioner as well as the cost of assembly of the tensioner.

In the following description, reference is made to the accompanying drawing that forms a part hereof and in which is shown by way of illustration at least one specific implementation. The following description provides additional specific implementations. It is to be understood that other implementations are contemplated and may be made without departing from the scope or spirit of the present disclosure. The following detailed description, therefore, is not to be taken in a limiting sense. While the present disclosure is not so limited, an appreciation of various aspects of the disclosure will be gained through a discussion of the examples, including the figures, provided below. In some instances, a reference numeral may have an associated sub-label consisting of a lower-case letter to denote one of multiple similar components. When reference is made to a reference numeral without specification of a sub-label, the reference is intended to refer to all such multiple similar components.

Turning to the figures, FIGS. 1 through 4 shows a tensioner 100, such as for an exercise bicycle or other belt driven exercise equipment; the tensioner 100 is a fixed tensioner. In this design, the tensioner 100 has a fastener, such as a bolt, that extends the length through the tensioner, the bolt securing the pulley-bearing assembly and also mounting the tensioner 100 to a bracket.

The tensioner 100 has a tensioning arm 110 with an axis that passes through an upright 112 of the tensioning arm 110. Centered around the axis is a pulley-bearing assembly 120 that includes a pulley 122 and a bearing 124; the pulley 122 can be integrated with the bearing 124, e.g., over molded. The pulley 122 rotates around the axis via the bearing 124. The pulley 122 can be made from, e.g., polymeric material (plastic) or metal (e.g., steel, aluminum) and can include side flanges to improve belt positioning and tracking. The bearing 124 can be, e.g., a plain bearing or a rotary bearing, e.g., a ball bearing or a roller bearing, it could be tapered or not, and can be a single or double row ball bearing.

The tensioning arm 110 has a tensioning mechanism 114 and a pivot point 116 (best seen in FIG. 4) for the tensioning arm 110. The tensioning mechanism 114 receives a torque wrench or other torquing tool to apply the desired and/or predetermined amount of torque and hence tension to the tensioner 100, as described further below. The tensioning mechanism 114 can be, e.g., an aperture or slot for receiving the torquing tool therein or a protrusion for receiving the torquing tool thereon or therearound. The pivot point 116 can be a bump, tab, or other protrusion, e.g., integral with the tensioning arm 110.

Figure 2:
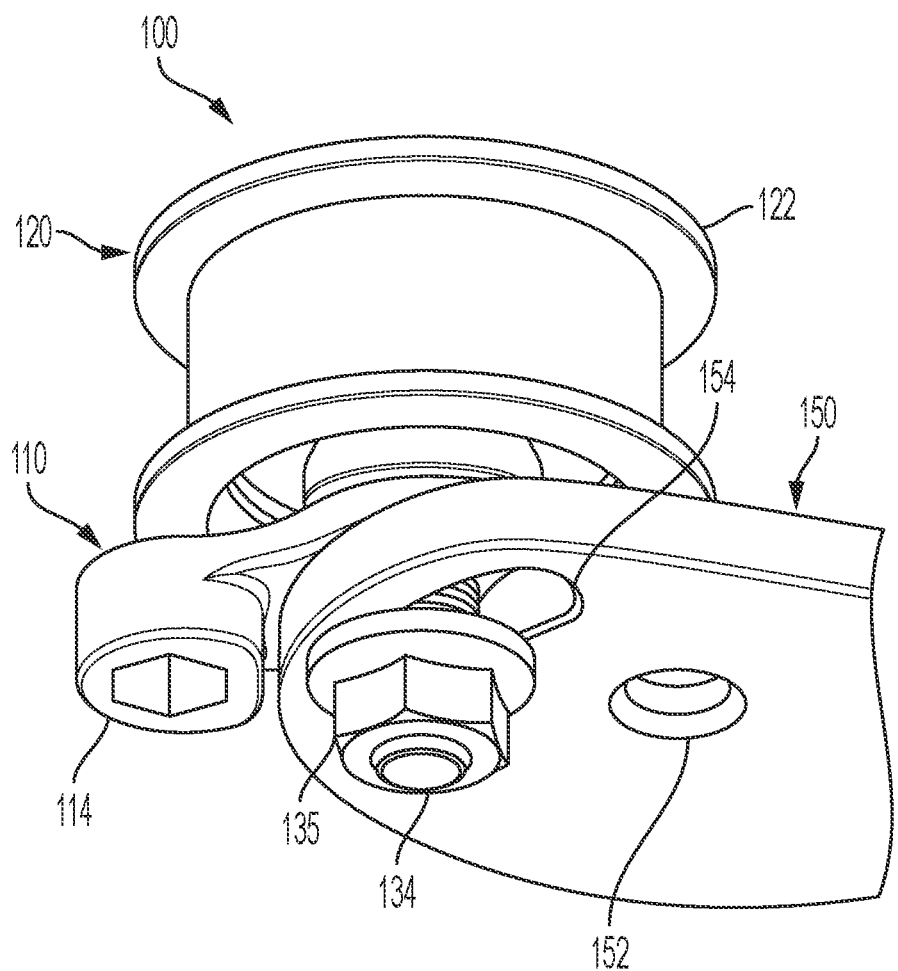
FIG. 2 is a bottom perspective view of the tensioner assembly of FIG. 1.
Figure 3:
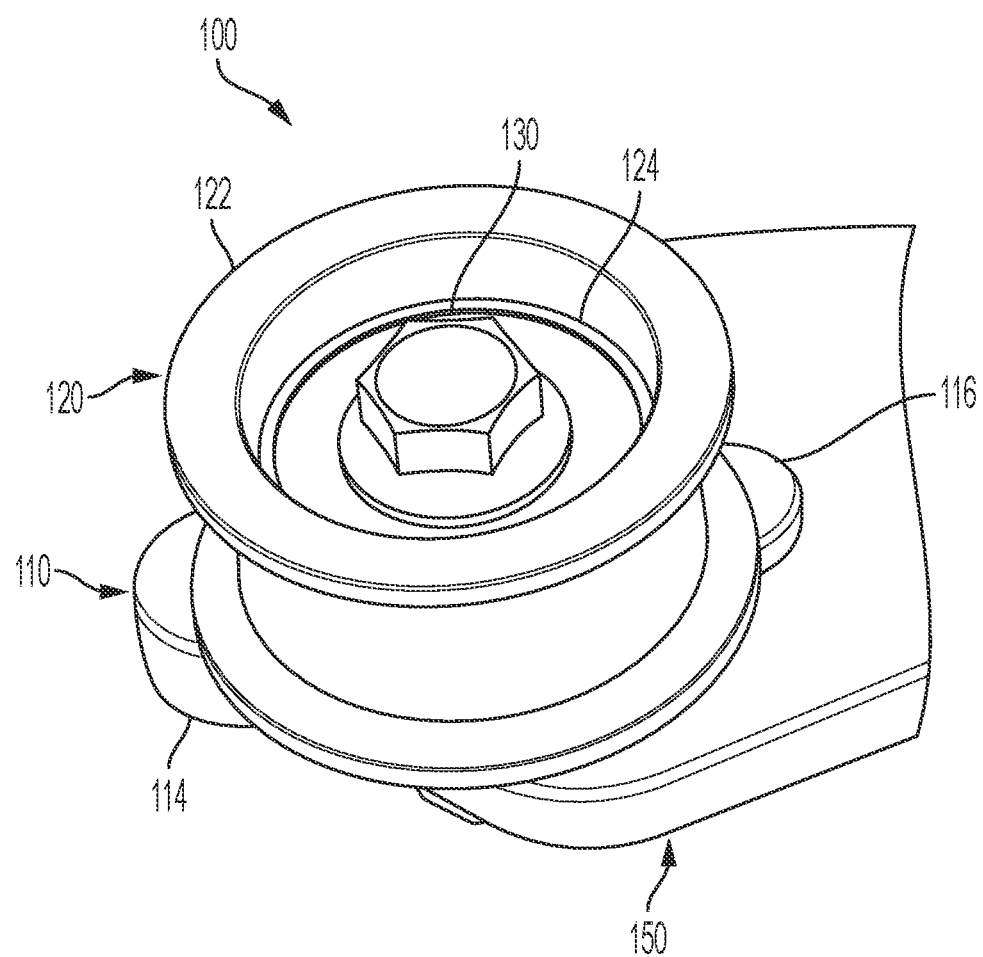
FIG. 3 is a top perspective view of the tensioner assembly of FIG. 1.
Figure 4:
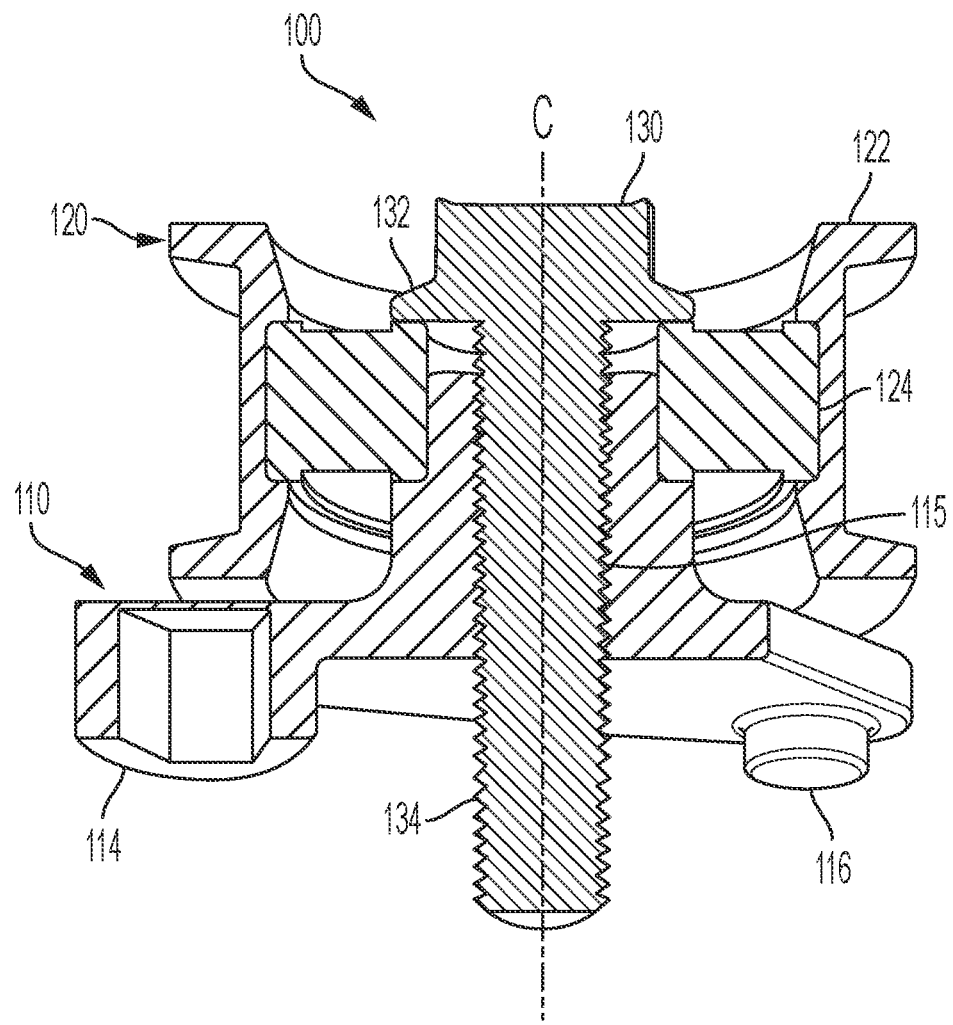
FIG. 4 is a cross-sectional view of the tensioner of FIG. 1.

The tensioner 100 is shown mounted to a bracket 150 in FIGS. 1 through 3, which is part of or is mounted to the exercise equipment frame. The bracket 150 includes a receiving feature 152, such as an aperture or depression, for receiving the pivot point 116. When the pivot point 116 is engaged with the receiving feature 152, the tensioner 100 can pivot about the pivot point 116 in relation to the bracket 150, if not otherwise fixed to the bracket 150. The bracket 150 also includes a slot 154, seen in FIG. 2. Additional details regarding the pivot point assembly 116 and the receiving feature 152, and the slot 154, are provided below.

For the tensioner 100, the tensioner 100 is fixed to the bracket 150 by a fastener (such as a bolt) 130 that is received in a threaded passage 115 through the tensioning arm 110, including through the upright 112. Additionally, the pulley-bearing assembly 120 is fixed to the tensioning arm 110 by the fastener 130. The fastener 130 has a flange 132 that seats against the bearing 124, holding the bearing 124 and thus the assembly 120 in place against the tensioning arm 110. A shaft 134 of the fastener 130 is threaded into the upright 112 of the tensioning arm 110. A nut 135 engages and secures the fastener 130 at the bracket 150.

To provide spatial context for the arrangement of the tensioner 100, the flange 132 of the fastener 130 is proximate, close to, or at a distal end D of the tensioning arm 110, in relation to the bracket 150. The nut 135 on the fastener 130 is proximate to the proximal end P of the tensioning arm 110.

To install a belt on the tensioner 100, the belt is installed on the pulley 122 with the nut 135 not tightened onto the fastener 130, thus allowing the fastener 130 to slide within the slot 154 and the pivot point 116 to rotate (pivot) within the receiving feature 152. The pulley 122 is, e.g., manually, pulled to apply tension to the belt; this adjustment can be made because the nut 135 is not tightened onto the fastener 130 so that the tensioner 100 can slide in the slot 154 and pivot about the pivot point 116 in the receiving feature 152. Upon obtaining an adequate torque, the nut 135 is tightened (e.g., finger tightened) to hold the position of the tensioner 100. Using a torque wrench or other torquing tool in the tensioning mechanism 114, the torque and thus tension is set to the desired and/or predetermined amount, since the belt tension directly relates to the applied torque. With the tension set, the nut 135 is further tightened (e.g., with a hex wrench or adjustable wrench) to secure the position of the tensioner 100 relative to the bracket 150. This process obtains the desired, predetermined belt tension for the tensioner 100 without a need to measure belt tension and/or reset the tensioner to a new position, e.g., if the installation tension does not meet the desired tension. Additionally, there is no need for a special tool for the installation; rather, common tools such as a torque wrench, hex wrench or adjustable wrench can be used.

Figure 5:
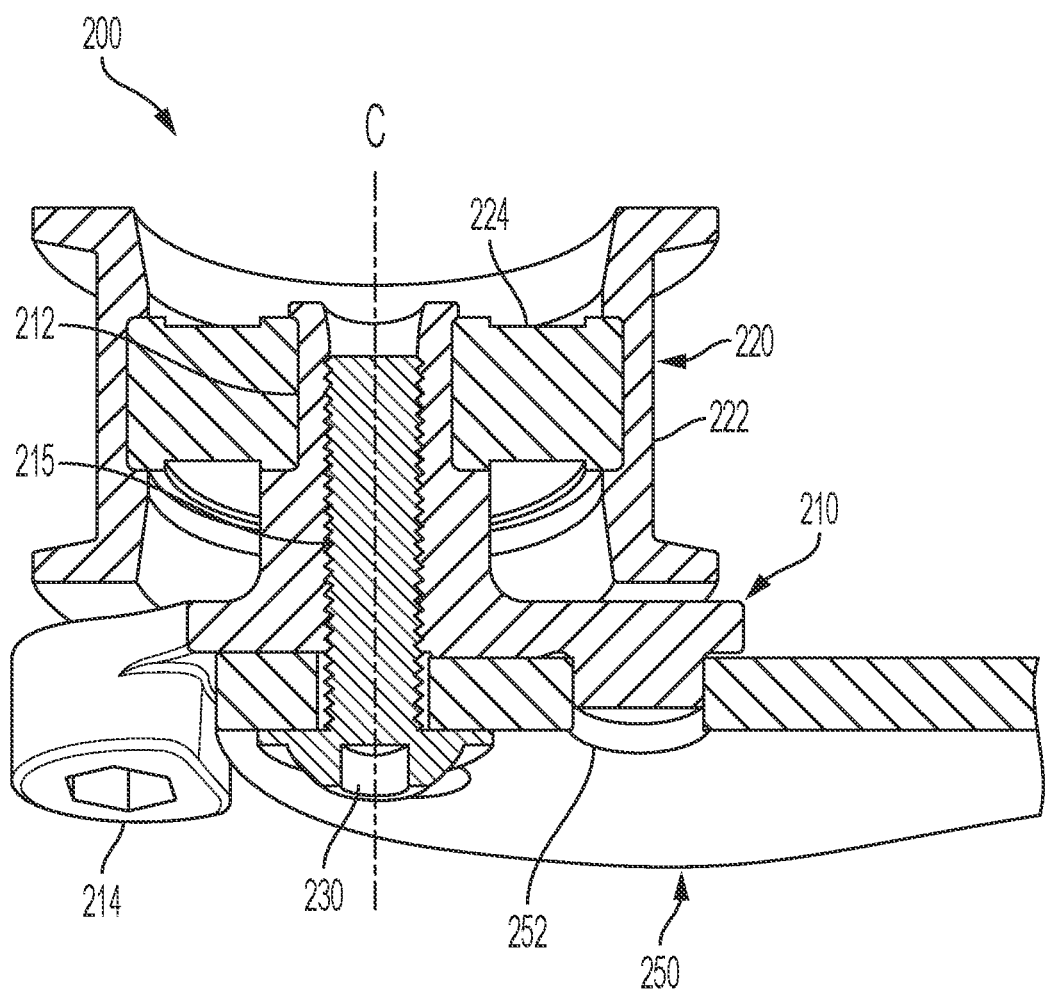
FIG. 5 is a cross-sectional, perspective view of a second example of a tensioner assembly.
Figure 6:
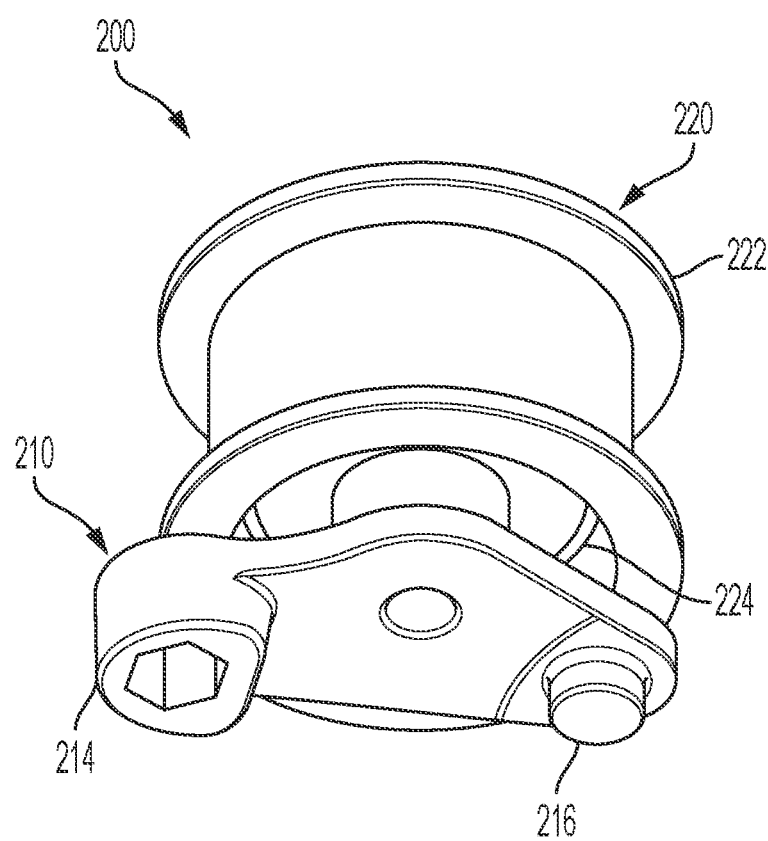
FIG. 6 is a bottom perspective view of the tensioner of FIG. 5.
Figure 7:
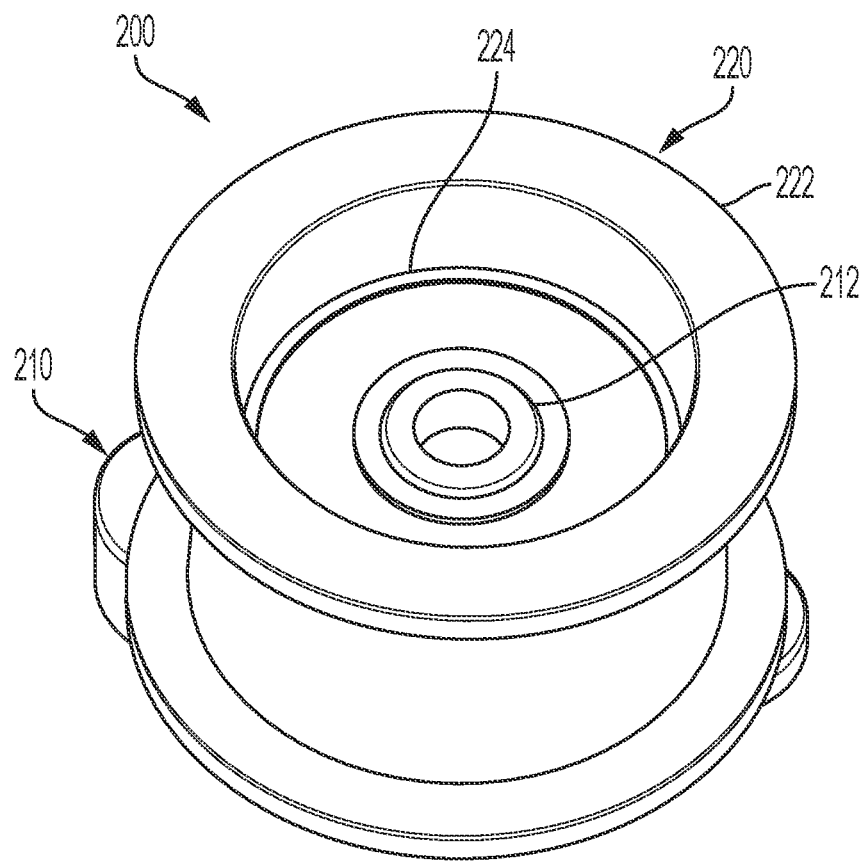
FIG. 7 is a top perspective view of the tensioner of FIG. 5.

FIGS. 5 through 7 show another fixed tensioner for an exercise bicycle or other belt driven exercise equipment, particularly, tensioner 200. In this design, the tensioner 200 has a swaged engagement of the pulley-bearing assembly onto the tensioning arm. A fastener, such as a bolt, extends into the tensioner to mount the tensioner 200 to a bracket. It is to be understood that various features and/or details from the tensioner 100, described above, may be applied to this tensioner 200 unless contrary to the construction.

Similar to the tensioner 100, the tensioner 200 has a tensioning arm 210 with an axis that passes through an upright 212 of the tensioning arm 210. Centered around the axis is a pulley-bearing assembly 220 that includes a pulley 222 and a bearing 224. The pulley 222 rotates around the axis via the bearing 224. The pulley-bearing assembly 220 is fixed to the tensioning arm 210 by a mechanical and/or frictional engagement created by a swaging process; for example, the upright 212 is deformationally expanded against the bearing 224 to hold the bearing 224 and the assembly 220 in fixed relation to the tensioning arm 210.

The tensioning arm 210 has a tensioning mechanism 214 and a pivot point protrusion 216 (best seen in FIG. 6). The tensioning mechanism 214 receives a torque wrench or other torquing tool to apply the desired and/or predetermined amount of torque and hence tension to the tensioner 200, as described further below.

The tensioner 200 is shown mounted to a bracket 250 in FIG. 5, which is part of or is mounted to the exercise equipment frame. The bracket 250 includes a receiving feature 252, such as an aperture or depression, for receiving the pivot point 216. The bracket 250 also includes a slot (not well seen in the figure). Additional details regarding the pivot point 216 and the receiving feature 252, and the slot, are provided below.

The tensioner 200 is fixed to the bracket 250 by a fastener (such as a bolt or screw) 230 that is received in a threaded passage 215 in the tensioning arm 210. In this design, the fastener 230 is a rounded or low profile bolt, e.g., a sunken head bolt or a button bolt, that may have a hex head. The fastener 230 may have an integral flange.

To install a belt on the tensioner 200, the belt is installed on the pulley 222 with the fastener 230 loosely tightened, thus allowing the fastener 230 to slide within the slot in the bracket 250 and the pivot point 216 to rotate (pivot) within the receiving feature 252. The pulley 222 is, e.g., manually, pulled to apply tension to the belt. Upon obtaining an adequate torque, the fastener 230 is tightened (e.g., finger tightened) to hold the position of the tensioner 200 in relation to the bracket 250. Using a torque wrench or other torquing tool in the tensioning mechanism 214, the torque and thus tension is set to the desired and/or predetermined amount, since the belt tension directly relates to the applied torque. With the tension set, the fastener 230 is further tightened (e.g., with an Allen wrench) to secure the position of the tensioner 200 relative to the bracket 250. This process obtains the desired, predetermined belt tension for the tensioner 200 without a need to measure belt tension and/or reset the tensioner to a new position, e.g., if the installation tension does not meet the desired tension. Additionally, there is no need for a special tool for the installation; rather, common tools such as a torque wrench, an Allen wrench or driver can be used.

Figure 8:
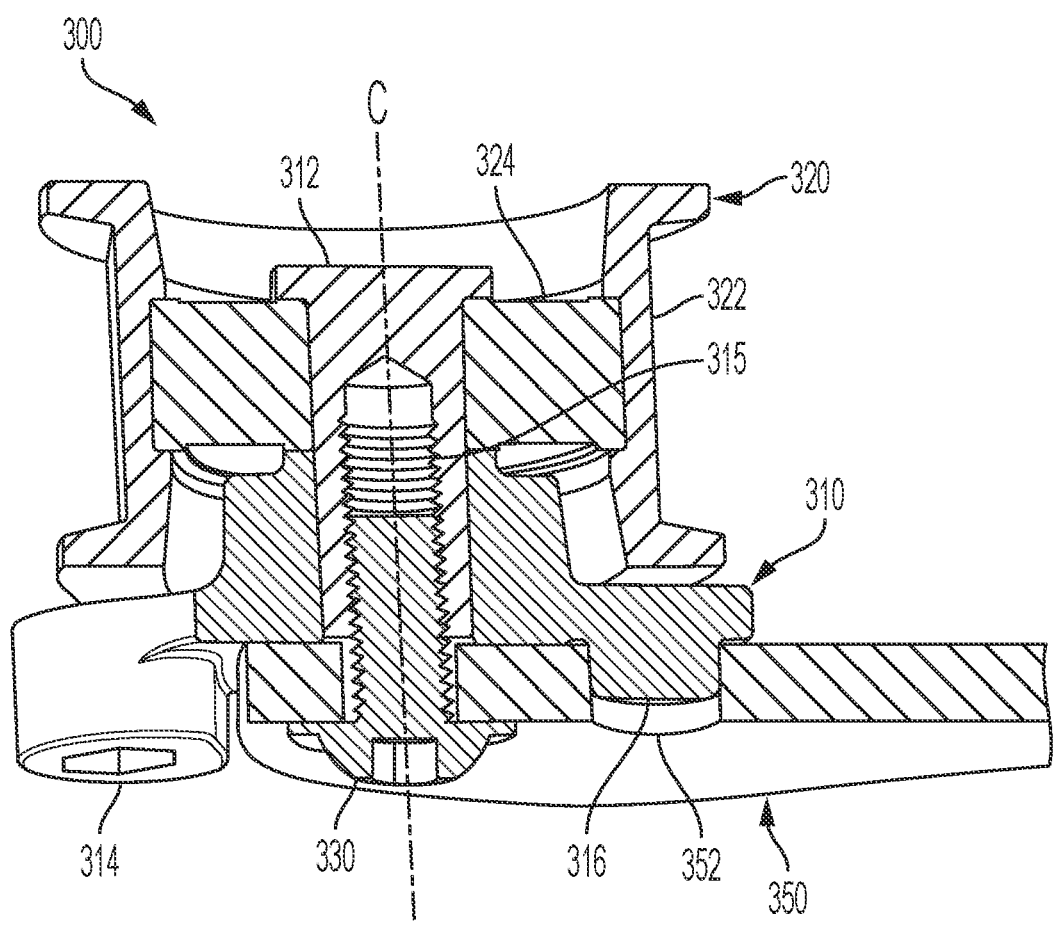
FIG. 8 is a cross-sectional, perspective view of a third example of a tensioner assembly.
Figure 9:
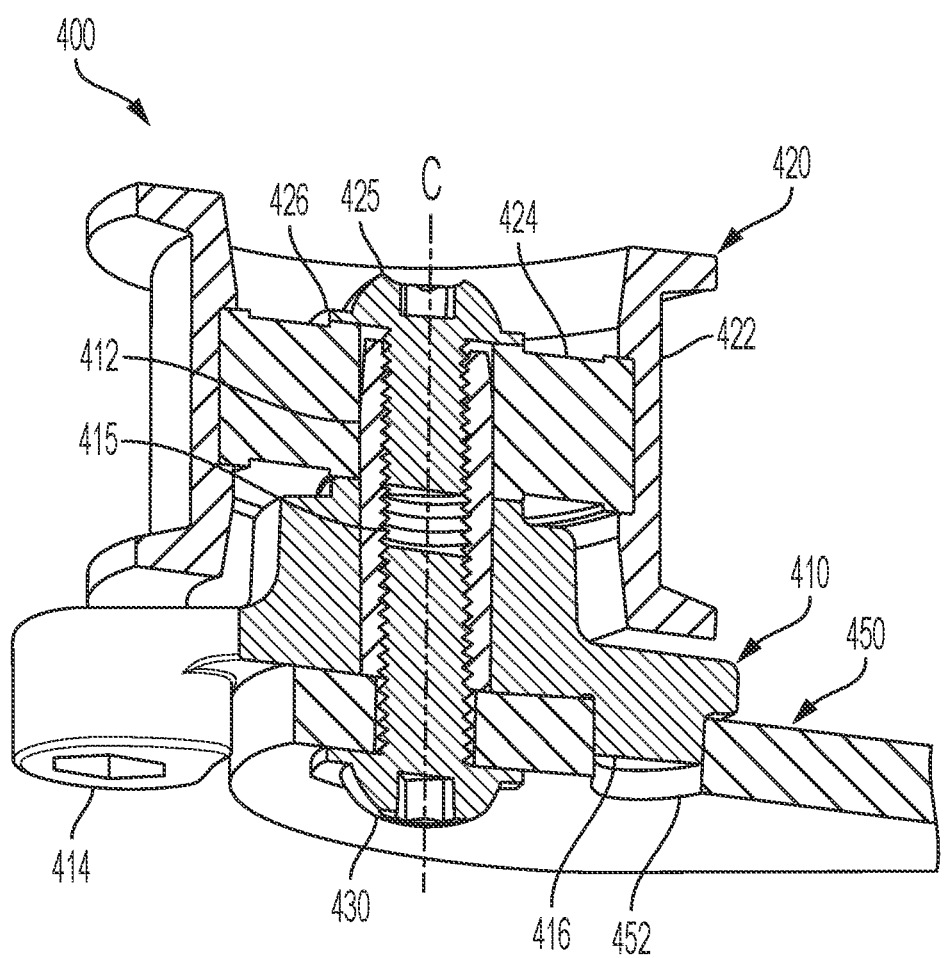
FIG. 9 is a cross-sectional, perspective view of a fourth example of a tensioner assembly.

FIGS. 8 and 9 show two additional fixed tensioners for an exercise bicycle or other belt driven exercise equipment, particularly, tensioner 300 (FIG. 8) and tensioner 400 (FIG. 9). In these designs, the tensioners 300, 400 have a separate insert into the tensioning arm at the axis to which the pulley-bearing is fixed. The inserts have internal threads, to receive fastener(s), such as bolt(s), therein. The inserts can be steel, e.g., stainless steel, mild steel, etc. It is to be understood that various features and/or details from the tensioners 100, 200, described above, may be applied to these tensioners 300, 400 unless contrary to the construction.

Turning to FIG. 8, the tensioner 300 has a tensioning arm 310 with a pulley-bearing assembly 320 that includes a pulley 322 and a bearing 324 centered on an axis of the tensioning arm 310. The pulley 322 rotates around the axis via the bearing 324. A flanged shaft 312, having an internally threaded passage 315 at least partially therethrough, extends into and through the tensioning arm 310. The flange of the flanged shaft 312 seats against the bearing 324, holding the bearing 324 and thus the pulley-bearing assembly 320 in place. The flanged shaft 312 can be press-fit into the tensioning arm 310.

Similar to the other designs of the tensioners, the tensioning arm 310 has a tensioning mechanism 314 and a pivot point protrusion 316.

The tensioner 300 is shown mounted to a bracket 350, which is part of or is mounted to the exercise equipment frame. The bracket 350 includes a receiving feature 352, such as an aperture or depression, for receiving the pivot point 316. The bracket 350 also includes a slot (not well seen in the figure). Additional details regarding the pivot point 316 and the receiving feature 352, and the slot, are provided below.

The tensioner 300 is fixed to the bracket 350 by a fastener (such as a bolt or screw) 330 that is received into the passage 315 in the shaft 312 through the bracket 350. In this design, the fastener 330 is a low profile bolt, e.g., a sunken head bolt or a button bolt.

Turning to FIG. 9, the tensioner 400 has a tensioning arm 410 with an axis. Centered around the axis is a pulley-bearing assembly 420 that includes a pulley 422 and a bearing 424. The pulley 422 rotates around the axis via the bearing 424. A sleeve 412, with an internally threaded passage 415 the full length of the sleeve 412, extends through the tensioning arm 410 and the bearing 424. A flanged fastener (such as a bolt or screw) 425 is present in one end of the sleeve 412, with the flange 426 of the fastener 425 seated against the bearing 424, holding the bearing 424 and thus the pulley-bearing assembly 420 in place. The sleeve 412 can be press-fit into the tensioning arm 410.

Similar to the other designs of the tensioners, the tensioning arm 410 has a tensioning mechanism 414 and a pivot point protrusion 416.

The tensioner 400 is shown mounted to a bracket 450, which includes a receiving feature 452 for receiving the pivot point 416. The bracket 450 also includes a slot (not well seen in the figure).

The tensioner 400 is fixed to the bracket 450 by a fastener (such as a bolt or screw) 430 that is received into the passage 415 in the sleeve 412 through the bracket 450. In this design, at least the fastener 430 is a low profile bolt, e.g., a sunken head bolt or a button bolt.

By using an insert such as the sleeve 412, particularly if formed from a high strength material such as steel, the fasteners 425, 430 can be shorter than with other materials (e.g., aluminum), thus decreasing the height of the tensioning arm 410, its weight and cost compared to using longer bolt(s). In this design, the fasteners 425, 430 do not extend the entire length of the passage 412.

To install a belt on either tensioner 300, 400, the belt is installed on the pulley 322, 422 with the fastener 330, 430 loosely tightened, thus allowing the fastener 330, 430 to slide within the slot in the bracket 350, 450 and the pivot point 316, 416 to rotate (pivot) within the receiving feature 352, 452. The pulley 322, 422 is, e.g., manually, pulled to apply tension to the belt. Upon obtaining an adequate torque, the fastener 330, 430 is tightened (e.g., finger tightened) to hold the position of the tensioner 300, 400 in relation to the bracket 350, 450. Using a torque wrench or other torquing tool in the tensioning mechanism 314, 414, the torque and thus tension is set to the desired and/or predetermined amount, since the belt tension directly relates to the applied torque. With the tension set, the fastener 330, 430 is further tightened (e.g., with an Allen wrench) to secure the position of the tensioner 300, 400 relative to the bracket 350, 450. As before, this process obtains the desired, predetermined belt tension for the tensioner 300, 400 without a need to measure belt tension and/or reset the tensioner to a new position, e.g., if the installation tension does not meet the desired tension. Additionally, there is no need for a special tool for the installation; rather, common tools such as a torque wrench, an Allen wrench or driver can be used.

Figure 10:
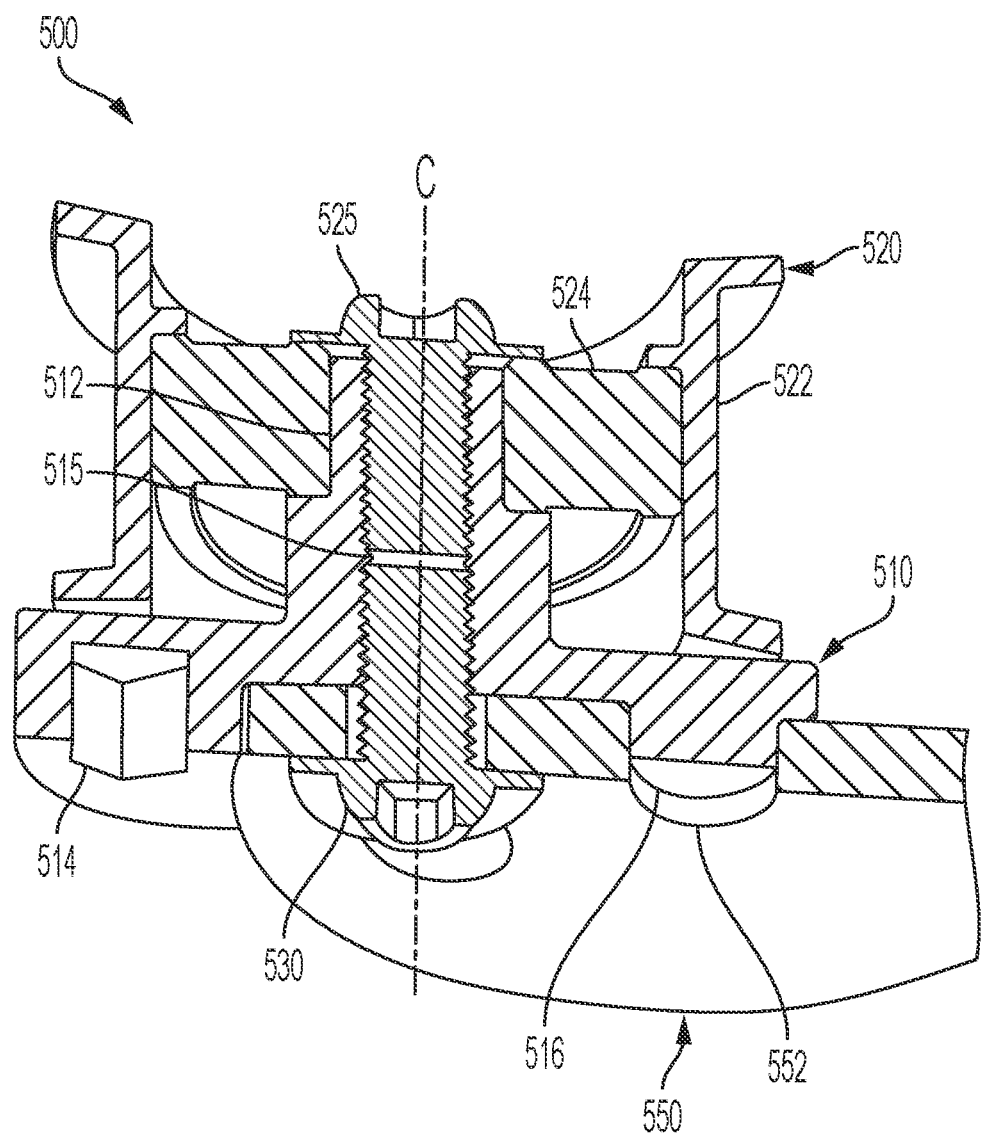
FIG. 10 is a cross-sectional, perspective view of a fifth example of a tensioner assembly.
Figure 11:
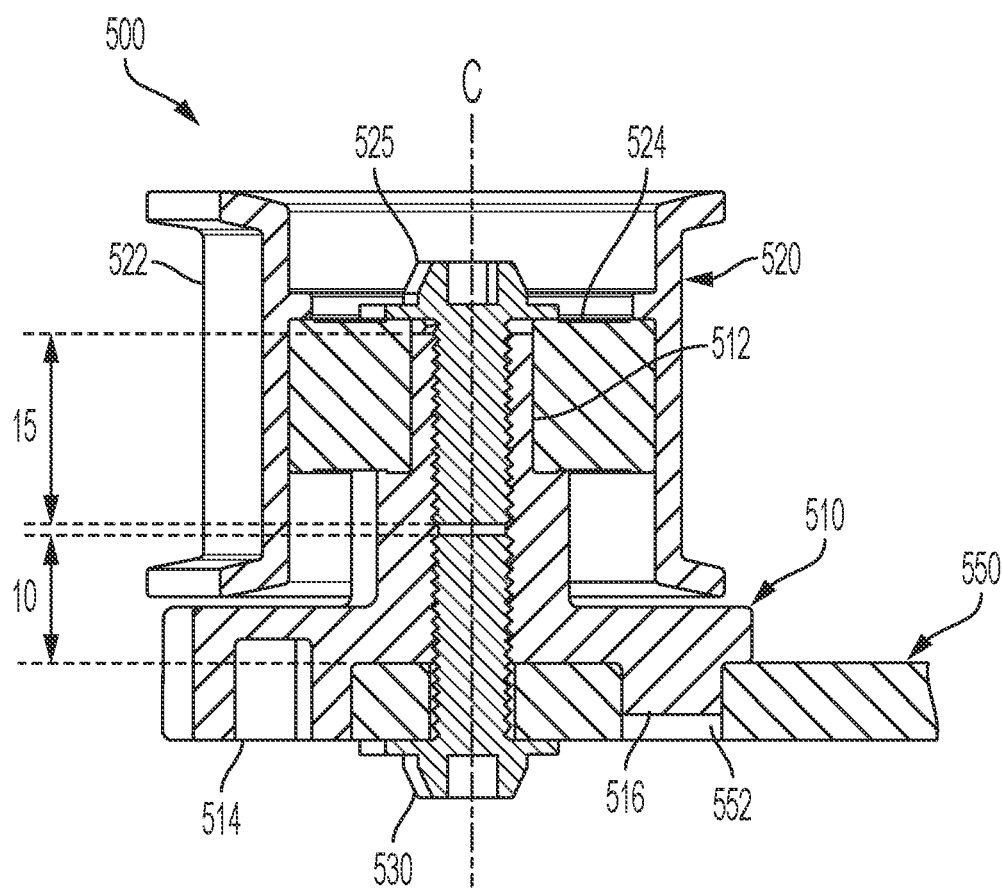
FIG. 11 is a cross-sectional view of the tensioner assembly of FIG. 10.

FIGS. 10 and 11 show another fixed tensioner 500 for an exercise bicycle or other belt driven exercise equipment. The tensioner 500 has one fastener to retain the pulley-bearing assembly to the tensioning arm and another fastener to retain the tensioner 500 to a bracket, both fasteners affixed into the tensioning arm. It is to be understood that various features and/or details from the tensioners 100, 200, 300, 400 described above, may be applied to this tensioner 500 unless contrary to the construction.

The tensioner 500 has a tensioning arm 510 with an axis that passes through an upright 512 of the tensioning arm 510. Centered around the axis and the upright 512 is a pulley-bearing assembly 520 that includes a pulley 522 and a bearing 524. The pulley 522 rotates around the axis via the bearing 524. A flanged fastener (such as a bolt or screw) 525 is threaded into a passage 515 in the upright 512 and seats against the bearing 524, holding the bearing 524 and thus the pulley-bearing assembly 520 in place against the tensioning arm 510.

Similar to the other designs of the tensioners, the tensioning arm 510 has a tensioning mechanism 514 and a pivot point protrusion 516.

The tensioner 500 is shown mounted to a bracket 550, which is part of or is mounted to the exercise equipment frame. The bracket 550 includes a receiving feature 552, such as an aperture or depression, for receiving the pivot point 516. The bracket 550 also includes a slot (not well seen in the figure).

The tensioner 500 is fixed to the bracket 550 by a fastener (such as a bolt or screw) 530 that is received into the passage 515 of the tensioning arm 510 through the bracket 550. In this design, at least the fastener 530 is a low profile bolt, e.g., a sunken head bolt or a button bolt.

To install a belt on the tensioner 500, the belt is installed on the pulley 522 with the fastener 530 loosely tightened, thus allowing the fastener 530 to slide within the slot in the bracket 550 and the pivot point 516 to rotate (pivot) within the receiving feature 552. The pulley 522 is, e.g., manually, pulled to apply tension to the belt. Upon obtaining an adequate torque, the fastener 530 is tightened (e.g., finger tightened) to hold the position of the tensioner 500 in relation to the bracket 550. Using a torque wrench or other torquing tool in the tensioning mechanism 514, the torque and thus tension is set to the desired and/or predetermined amount, since the belt tension directly relates to the applied torque. With the tension set, the fastener 530 is further tightened (e.g., with an Allen wrench) to secure the position of the tensioner 500 relative to the bracket 550. This process obtains the desired, predetermined belt tension for the tensioner 500 without a need to measure belt tension and/or reset the tensioner to a new position, e.g., if the installation tension does not meet the desired tension. Additionally, there is no need for a special tool for the installation; rather, common tools such as a torque wrench, an Allen wrench or driver can be used.

Thus, numerous designs of tensioners having the pulley-bearing assembly fixedly attached to the tensioning arm via the same axial aperture or shaft by which the tensioner is attached to a bicycle frame or a bracket have been shown and described. The tensioning arm includes a protrusion or other feature that provides a pivot point for the tensioner during the belt installation process. The tensioning arm also incorporates a tensioning adjustment, such as a hole or protrusion for engagement with a torque wrench or of a simple wrench to tension the tensioner during installation.

Although example materials for certain components or parts have been provided above, the various components or parts of the tensioners 100, 200, 300, 400, 500 and variations thereof may be formed of any suitable material, including metal (e.g., iron, steel, nickel, aluminum), composite materials (e.g., ceramics), polymeric materials, and any combination thereof. The components may be molded, cast, forged, extruded, or formed by any suitable process. Any of the components or parts may have a coating thereon to, e.g., decrease surface friction, increase durability and decrease physical wear, increase chemical resistance, etc.

Various features and details have been provided in the multiple designs described above. It is to be understood that any features or details of one design may be utilized for any other design, unless contrary to the construction or configuration. Any variations may be made. For example, any of the bolts 130, 230, etc., may be self-tapping bolts, or the respective upright 112, 212, may be pre-threaded to receive the bolt therein. The flanged shaft 312 and/or the sleeve 412 may be pre-threaded or may be used with self-tapping bolts. Additionally, all or any of the bolts or other fasteners may be externally driven, e.g., via a hex wrench, a crescent wrench, pliers, etc., or may be internally driven, e.g., via a torque wrench, an Allen wrench, etc., or by a screwdriver, e.g., straight drive, Phillips drive, star drive, square drive, etc.

Overall, the exemplary tensioners of this disclosure have a number of advantages, including:
- a smaller form factor and weight, and are more rigid, than previous;
- reduced number of parts;
- improved and easier belt installation process, e.g., reduced installation torque, and use of common tools;
- more accurate belt installation tension;
- improved belt tracking and belt retention; and
- reduced manufacturing and assembly costs.

The tensioners described herein and variations thereof may be incorporated into a broad range of belt drive systems and other systems that utilize fixed tensioners in addition to exercise equipment. The tensioners can be used in numerous other systems including ABDS (accessory belt drive systems), SBDS (synchronous belt drive system), BSG (belt starter generator, e.g., for hybrid vehicles), dual arm tensioners, CVT (continuously variable transmissions), serpentine belts, water pumps, timing, etc. The tensioners can be used with v-belts, micro-v belts, double v belts, flat belts, round belts, etc., that may be made from rubber or polymer (e.g., polyurethane) and may be reinforced.

The above specification and examples provide a complete description of the structure and use of exemplary implementations of the invention. The above description provides specific implementations. It is to be understood that other implementations are contemplated and may be made without departing from the scope or spirit of the present disclosure. The above detailed description, therefore, is not to be taken in a limiting sense. While the present disclosure is not so limited, an appreciation of various aspects of the disclosure will be gained through a discussion of the examples provided.

Unless otherwise indicated, all numbers expressing feature sizes, amounts, and physical properties are to be understood as being modified by the term "about," whether or not the term "about" is immediately present. Accordingly, unless indicated to the contrary, the numerical parameters set forth are approximations that can vary depending upon the desired properties sought to be obtained by those skilled in the art utilizing the teachings disclosed herein.

As used herein, the singular forms "a", "an", and "the" encompass implementations having plural referents, unless the content clearly dictates otherwise. As used in this specification and the appended claims, the term "or" is generally employed in its sense including "and/or" unless the content clearly dictates otherwise.

Spatially related terms, including but not limited to, "bottom," "lower", "top", "upper", "beneath", "below", "above", "on top", "on," etc., if used herein, are utilized for ease of description to describe spatial relationships of an element(s) to another. Such spatially related terms encompass different orientations of the device in addition to the particular orientations depicted in the figures and described herein. For example, if a structure depicted in the figures is turned over or flipped over, portions previously described as below or beneath other elements would then be above or over those other elements.

What is claimed is:

1. A fixed belt tensioner comprising a tensioning arm defining an axis, the tensioning arm having a distal end and a proximal end along the axis, a pulley-bearing assembly mounted to the tensioning arm centered on the axis proximate the distal end, a tensioning mechanism on the tensioning arm configured to apply torque to the tensioner, and a passage into the tensioning arm aligned with the axis proximate the proximal end, the passage for receiving a fastener to attach the tensioner to a bracket.

2. The tensioner of claim 1, wherein the tensioning mechanism comprises an aperture for receiving a torquing tool.

3. The tensioner of claim 1, the tensioning arm further comprising a protrusion at the proximal end configured to be received in a receiving feature of the bracket and provide a pivot point.

4. The tensioner of claim 1, wherein the passage into the tensioning arm is internally threaded.

5. The tensioner of claim 1, wherein the passage extends through the tensioning arm from the distal end to the proximal end.

6. The tensioner of claim 1, wherein the passage into the tensioning arm is present in an insert in the tensioning arm.

7. The tensioner of claim 6, wherein the insert is a sleeve with the passage extending through the sleeve.

8. The tensioner of claim 6, wherein the insert is a shaft with the passage extending into the shaft from the proximal end.

9. The tensioner of claim 8, wherein the shaft is a flanged shaft that engages the pulley-bearing assembly.

10. A fixed belt tensioner assembly comprising a tensioner, a mounting bracket, and a fastener:
   the tensioner having a tensioning arm defining an axis and having a first end and a second end along the axis, a pulley-bearing assembly mounted to the tensioning arm centered on the axis proximate the first end, a tensioning mechanism on the tensioning arm configured to apply torque to the tensioner, and a passage into the tensioning arm aligned with the axis proximate the second end,
   the bracket having an aperture, and
   the fastener extending through the aperture in the bracket into the passage in the tensioning arm.

11. The tensioner assembly of claim 10, wherein the tensioning mechanism comprises an aperture for receiving a torquing tool.

12. The tensioner assembly of claim 10, the tensioner further comprising a protrusion at the second end configured to be received in a receiving feature of the bracket.

13. The tensioner assembly of claim 10, wherein the passage into the tensioning arm is internally threaded.

14. The tensioner assembly of claim 10, wherein the passage extends through the tensioning arm from the distal end to the proximal end.

15. The tensioner assembly of claim 10, wherein the passage into the tensioning arm is present in an insert in the tensioning arm.

16. The tensioner assembly of claim 15, wherein the insert is a sleeve with the passage extending through the sleeve.

17. The tensioner assembly of claim 15, wherein the insert is a shaft with the passage extending into the shaft from the proximal end.

18. The tensioner assembly of claim 17, wherein the shaft is a flanged shaft that engages the pulley-bearing assembly.

19. A method of installing a belt tensioner, the method comprising:
   installing a belt on a pulley of the tensioner;
   with the belt on the pulley, adjusting the position of the pulley in relation to a bracket by pivoting the tensioner in relation to the bracket;
   tightening a fastener retaining the tensioner to the bracket;
   after tightening the fastener, applying torque to the tensioner with a tensioning mechanism of the tensioner using a torquing tool; and after applying torque to the tensioner using a torquing tool, further tightening the fastener retaining the tensioner to the bracket.

20. The method of claim 19, wherein adjusting the position of the pulley comprises sliding the tensioner in relation to a slot in the bracket.

\* \* \* \* \*